United States Patent [19]

Matsui et al.

[11] Patent Number: 4,639,355

[45] Date of Patent: Jan. 27, 1987

[54] PROCESS FOR RECOVERING GALLIUM FROM ALUMINUM SMELTING DUST

[75] Inventors: Shingo Matsui; Hidetsugu Ikeda; Akio Era, all of Fukuoka; Sanji Nishimura, Kyoto, all of Japan

[73] Assignee: Mitsui Aluminium Co., Ltd., Tokyo, Japan

[21] Appl. No.: 757,591

[22] Filed: Jul. 22, 1985

[51] Int. Cl.$^4$ .............................................. C01G 15/00
[52] U.S. Cl. .......................... 423/112; 423/DIG. 14; 75/101 BE
[58] Field of Search ....................... 423/112, DIG. 14; 75/101 BE

[56] References Cited

U.S. PATENT DOCUMENTS 4,369,166 1/1983 Leveque et al. .................... 423/112
4,404,174 9/1983 Leveque et al. .................... 423/112

FOREIGN PATENT DOCUMENTS 54461 6/1982 European Pat. Off. ............ 423/112
WO85/02171 5/1985 Int'l Pat. Institute .............. 423/112
991614 5/1965 United Kingdom ................ 423/112

Primary Examiner—H. T. Carter
Attorney, Agent, or Firm—Jordan and Hamburg

[57] ABSTRACT

The present invention provides for the recovery of gallium from aluminum smelting dust. Aluminum smelting dust is leached with mineral acid, such as sulfuric acid, hydrochloric acid, or nitric acid. Gallium is extracted from the obtained leach liquor with an organic solution containing a liquid cation exchange agent. The resulting loaded organic solution is treated with mineral acid in aqueous solution, either after or before scrubbing with a higher concentration of acid in aqueous solution, to strip gallium. Gallium is extracted from this solution with another organic solution containing an ion-pair extracting type extracting agent. Finally, purified gallium is recovered by stripping the latter loaded organic solution with water or dilute acid in aqueous solution.

9 Claims, 1 Drawing Figure

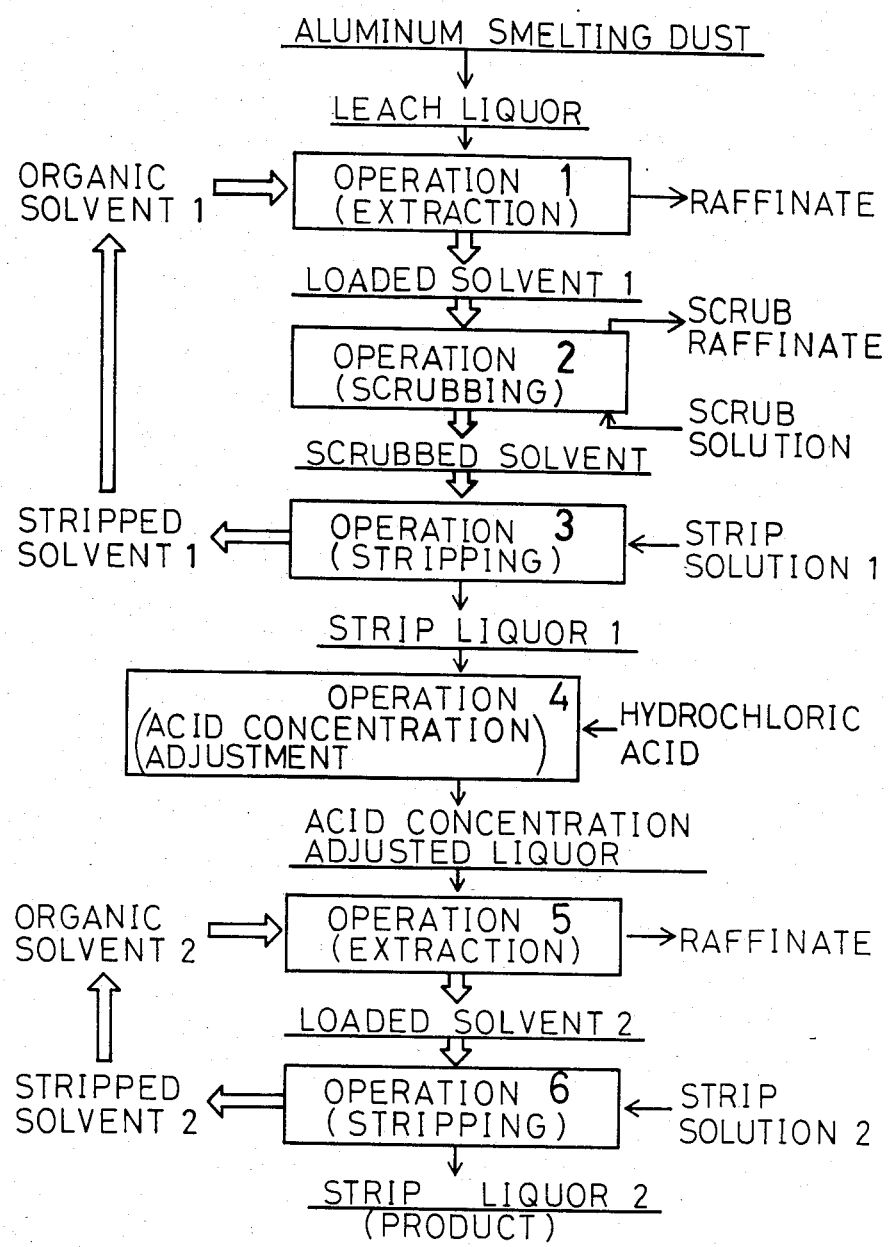

PROCESS FOR RECOVERING GALLIUM FROM ALUMINUM SMELTING DUST

BACKGROUND OF THE INVENTION

The present invention relates to a process for recovering gallium from smelting dust.

Gallium is used as GaAs for high-speed semiconductors for satellite correspondence, IC for high-speed computers, GaAs or GaP for semiconductor lasers for optical communication and mass magnetic bubble domain memories using gallium gadolinium garnet.

Gallium is widely distributed all over the earth, but does not exist as highly concentrated ore.

Therefore, gallium is presently obtained by the following processes
  (i) Gallium is recovered from Bayer liquor, which is a highly concentrated alkaline solution dissolving Al(OH)$_3$. An electrochemical reduction process with a mercury cathode or a solvent extraction process is used for recovering gallium from the Bayer liquor.
  The solvent extraction process developed by Rhone-Poulenc Co. using KELEX 100 (trade name) is wellknown (See pages 439–442, Vol. 2, 1979, Proceeding of the International Solvent Extraction Conference, . French Pat. No. 7629009), and KELEX 100 is an extracting agent such as alkylated-8-hydroxyquinoline.
  (ii) Gallium is recovered from aluminum smelting dust by flotation or alkaline roasting (See British Pat. No. 1527981).
  (iii) Gallium is recovered from residue of the zinc leach solution in a zinc smelting process, in which the residue is leached with sulfuric acid. Gallium is recovered by an extracting agent such as versatic acid or isopropyl ether (see pages 65–76, Proceeding of Fourth Joint Meeting MMIJ-AIME 1980, Tokyo).

Though gallium is recovered from the residue of a zinc leach solution (iii) in Japan, the major source of gallium is bauxite, which is the raw material for making aluminum. However, the efficiency of recovering gallium directly from bauxite is low because of the low gallium content in bauxite, e.g., 50-100 p.p.m.

The process for recovering gallium from Bayer liquor is mentioned in process (i) above. Electrochemical reduction with a mercury cathode creates an environmental pollution problem because of the mercury. The solvent extraction process also has problems, e.g., deterioration of the expensive extracting agent, loss by decomposition and the suspension and contamination of the Bayer liquor itself, with organics because the Bayer liquor is highly caustic.

The complicated processes and expensive treating costs are required in process (i) because of the very low gallium content. Accordingly, aluminum smelting dust having a comparatively high gallium content is preferable as the raw material. Gallium contained in Bayer liquor exhibits the same behavior as aluminum, . Almost all the gallium goes into alumina. The gallium concentration in alumina depends on the quality of the bauxite, and 10–100 p.p.m. is usual. Therefore, gallium in the dust created during the electrolysis by using alumina is highly concentrated to 800 p.p.m.–3000 p.p.m. The general composition of dust evolved from an aluminum electrolysis process is 0.08–0.30 wt% of gallium, 0.5–2.0 wt% of iron, 10–20 wt% of aluminum, 10–20 wt% of sodium, 10–30 wt% of flourine, 10–30 wt% of carbon and less than 1 wt% of silicon, nickel, titanium, calcium, copper, magnesium, cobalt and vanadium.

British Pat. No. 1527981 relates to a process for producing gallium from aluminum smelting dust containing, at the most, 0.2% gallium.

The process consists of roasting the dust at a temperature of 500°–800° C., after adding alkali flux in a large excess (5 times the dust weight, for example), followed by leaching the roasted mixture of dust and flux with water, and then precipitating the dissolved gallium by adding base metal powder (aluminum or magnesium) into the leach liquor.

However, the above-mentioned process has a great limitation, practically, because iron, or aluminum, etc., are also recovered togethe with the gallium at the same time, and more of the expensive alkaline flux is added than the amount of the dust for roasting. The cost of the alkaline flux may exceed the price of the gallium to be recovered.

SUMMARY OF THE INVENTION

It is an object of the present invention to provide a process for recovering high purity gallium from aluminum smelting dust with a high efficiency.

It is another object of the present invention to provide a process for recovering gallium continuously without using a tedious process such as a high-temperature treatment. The above-mentioned objects of the present invention are accomplished by the following process for recovering gallium from aluminum smelting dust:

(a) leach liquor is obtained by leaching aluminum smelting dust with mineral acid;
  (b) gallium is extracted by extracting the leach liquor obtained in step (a) with an organic solution containing a liquid cation exchange agent;
  (c) impurities such as iron, vanadium and aluminum extracted together with gallium in the loaded organic solution are scrubbed off by scrubbing the loaded organic solution obtained in step (b) with mineral acid in aqueous solution having a higher concentration;
  (d) gallium is stripped from the loaded organic solution by stripping the loaded organic solution scrubbed in step (c) with mineral acid in aqueous solution having a lower concentration;
  (e) the acid concentration of the stripped liquor obtained after step (d) is adjusted to a higher concentration;
  (f) all gallium and a portion of the iron are extracted by extracting the stripped liquor obtained after adjusting the acid concentration in step (e) with another organic solution containing a neutral extracting agent or a basic extracting agent of the ion-pair extracting type; and.
  (g) gallium is stripped by stripping the loaded organic solution obtained in step (f) with water or dilute mineral acid solution.

BRIEF DESCRIPTION OF THE DRAWING

The accompanying drawing is a flow diagram of the process for recovering gallium in the present invention.

DETAILED DESCRIPTION OF THE PREFERRED EMBODIMENTS

The dust evolved in the aluminum smelting process is used for the starting raw material in the present invention. 0.08-0.30 wt% of gallium is contained in this dust, and iron, aluminum, sodium, etc., are also contained as other components. Initially, the aluminum smelting dust is leached with mineral acid as shown in the drawing, and then gallium is extracted by an organic solution 1 and an organic solution 2.

Any of sulfuric acid, hydrochloric acid and nitric acid are useful as the mineral acid. The organic solution consists of an extracting agent and a diluent, . The following liquid cation exchange agents are preferred for use as the extracting agent:

(1) Acid organic phosphoric, phosphonic and phosphinic compounds, especially those having 8-20 carbon atoms in one molecule, for example, 2-ethylhexyl phosphonic acid, mono-2-ethylhexyl ester or di-2-ethylhexyl phosphoric acid (DEHPA);

(2) Carboxylic acids, especially carboxylic acids having 6-20 carbon atoms, for example, naphthenic acid

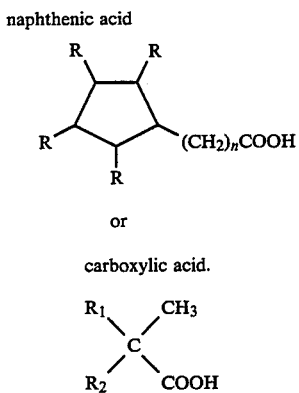

or carboxylic acid.

$$\begin{array}{c} R_1 \diagdown \diagup CH_3 \\ C \\ \diagup \diagdown \\ R_2 \quad COOH \end{array}$$

(3) Sulfonic acids, especially alkylbenzylsulfonic acid, or dialkylnaphthalene sulfonic acid.

The diluent for the organic solution 1 should be miscible with the above-mentioned extracting agents and insoluble in water. For example, paraffine solvent, aromatic solvent, naphthene solvent, halogenated-hydrocarbon solvent, higher alcohol, phenol and ketone can be enumerated.

The organic solution 2 consists of an extracting agent and a diluent. As the extracting agent, an ion-pair extracting type neutral extracting agent, such as isopropyl ether, tributyl phosphate (TBP), methyl isobutyl ketone (MIBK) and trioctyl phosphine oxide, or a basic extracting agent, such as primary amine, secondary amine, tertiary amine and quaternary ammonium salt can be used. The diluent for the organic solution 1 is preferentially used as a diluent for the organic solution 2. The process according to the present invention is performed by operations 1-6 as shown in the drawing.

In the steps 1-6, organic solution and aqueous solution are mixed with each other for extracting or stripping metals, and then both solutions are separated. A mixer-settler, pulse-column and rotary-disk-column, etc., are used as the apparatus.

These operations will now be explained.

(OPERATION 1)

Aluminum smelting dust is leached with mineral acid, and the pH of the obtained leach liquor is controlled in the range of 1-3. Gallium is, quantitatively, and iron, vanadium and aluminum are, partly or wholly, extracted with the organic solution 1 containing the liquid cation exchange agent. Non-extracted iron, vanadium, aluminum and other metals remain in the aqueous solution.

(OPERATION 2)

The loaded organic solution 1 obtained in operation 1 is scrubbed an aqueous solution of 4-9 mol/l hydrochloric acid, and iron, vanadium and aluminum are stripped.

The stripping of iron is most important in this operation.

Iron is hardly stripped at all with a low concentration acid. Gallium is not stripped if the concentration of hydrochloric acid is higher than 5 mol/l. Therefore, 5-9 mol/l hydrochloric acid solution is preferable for the scrub solution. Iron, aluminum and vanadium are stripped well with 7 mol/l hydrochloric acid solution, when 30 vol% di-2-ethylhexyl phosphoric acid (DEHPA) is used as the organic solution 1. The loss of gallium is decreased when the flow ratio of scrubbing solution to the organic solution 1 is as low as possible.

However, when the stripping ratio of iron becomes lower (the stripping ratio of iron is 50% given a flow volume ratio of organic phase (O)/aqueous phase (A)=5/1, for example), iron accumulates in the organic solution 1, resulting in a decrease in the extracting capacity. The stripping ratio of iron becomes higher when the flow ratio of scrub solution becomes higher, but the loss of gallium is also increased.

As explained above, the scrubbing in operations 2 and 3 entails removing the metals from the organic solution 1. In other words, the organic solution 1 reacted with metals is recirculated and used again in operation 1.

(OPERATION 3)

The organic solution 1 scrubbed in operation 2 is stripped with the strip solution 1 which consists of an aqueous solution having an acid concentration higher than 0.1 mol/l, and gallium is quantitatively stripped into the strip solution 1. The organic solution 1, from which gallium is stripped, is circulated to operation 1 and reused. Sulfuric acid, hydrochloric acid and nitric acid can be used for the acid. However, the selection of acid depends on the later processes. When using hydrochloric acid, a concentration of 0.1-5 mol/l is preferable.

In this step, gallium extracted into the organic solution 1 is stripped almost completely and is transferred to the aqueous solution. However, small amount of aluminum, vanadium and iron are stripped, depending on the condition of scrubbing in operation 2.

Operation 2 can be performed after operation 3 because the most important purpose of operation 2 is stripping iron from the organic solution 1.

(OPERATION 4)

The strip liquor obtained in operation 3 still contains iron, aluminum and vanadium, as well as gallium. These impurities will be removed in operations 4, 5 and 6 by further treatment.

Operation 4 is an acid concentration adjusting step for the strip liquor 1 to be used in operation 5, in which vanadium and aluminum are effectively removed. Hydrochloric acid is preferable for this purpose, and the acid concentration is 3 mol/l or higher.

Gallium metal is finally obtained by electrochemical reduction of alkaline gallium solution. The acid solution obtained in the solvent extraction process is neutralized to precipitate gallium ion as hydroxide which is then separated by filtration, washed and dissolved in caustic soda solution for electrolysis.

The hydroxide of iron is insoluble in alkaline solution, and it can be separated by filtration from the alkaline gallium solution, whereas aluminum and vanadium behave in a similar way to gallium and are dissolved in the alkaline solution. Though aluminum cannot be reduced electrochemically, too much aluminum should be avoided, for colloidal aluminum hydroxide produced in the course of neutralization makes the filtration and washing of gallium hydroxide difficult. Vanadium is very injurious to the electrolysis. Sometimes, the presence of small amounts of vanadium (0.02 %) makes electrolysis impossible. The utmost removal of vanadium is thus required.

(OPERATION 5)

All gallium is extracted by extracting the gallium containing strip liquor 1, whose acid concentration has been adjusted in operation 4, with organic solution 2 containing a neutral extracting agent or a basic extracting agent, which are of the ion-pair extracting type. As mentioned before, it is preferable to use a gallium containing aqueous solution having more than 3 mol/l hydrochloric acid concentration, although this depends on the kinds and concentration of extracting agent used. Since aluminum or vanadium is hardly extracted, almost all of the aluminum and vanadium remain in the aqueous solution.

(OPERATION 6)

The loaded organic solution 2 obtained in operation 5 is stripped with a strip solution 2, e.g., water or dilute acid, and gallium is quantitatively stripped.

The organic solution 2, whose gallium is removed by stripping, is circulated to operation 5 and reused.

The obtained aqueous solution containing purified gallium is sent to an electrochemical-reduction process, and gallium metal is recovered.

The process of the present invention is performed more effectively by adopting a proper concentrating operation of metals in the above-mentioned operations 1-6.

When the proportion of organic phase to aqueous phase (hereinafter called O/A) is controlled to 1/1 in operation 1, for example, and then the O/A in operation 2 is controlled to 2/1, the concentrations of iron, aluminum and vanadium in the scrub solution are easily controlled to double the concentration in the organic solution 1. Furthermore, the required amount of scrub solution is easily reduced to 1/2.

Additionally, when the O/A in operation 3 is controlled to 10/1, the concentration of gallium is easily concentrated to ten times the concentration of gallium in the dust leach liquor. When the O/A in operations 5 and 6 is controlled to 4/1 and 3/1, respectively, the concentration of gallium in the obtained strip liquor 2 is easily concentrated to twelve times the concentration of gallium in the aqueous solution in operation 5.

In the above-mentioned operations 1-6, gallium is purified and concentrated to more than 100 times, and then the volume of gallium liquor is controlled to less than one-one hundredths. Therefore, a small sized apparatus can be employed in the subsequent process.

The embodiment of the present invention is shown in the following example.

(EMBODIMENT)

An organic solution 1 comprising kerosine solution having 30 vol% di-2-ethylhexyl phosphoric acid (DEHPA) and a dust leach liquor with sulfuric acid were treated under the condition of O/A=1/1 in operation 1. The loaded organic solution 1 obtained in operation 1 was treated with a scrub solution of 7 mol/l hydrochloric acid in aqueous solution under the condition of O/A=2/1 in operation 2, and iron, aluminum and vanadium were scrubbed and removed from the loaded organic solution 1.

The organic solution 1 scrubbed in operation 2 was treated with a strip solution 1 of 2 mol/l hydrochloric acid in aqueous solution under the condition O/A=10/1 in operation 3, and gallium was stripped. The concentration of hydrochloric acid in the strip liquor 1 obtained in operation 3 was adjusted to 4 mol/l by adding concentrated hydrochloric acid in operation 4. The aqueous solution obtained in operation 4 was treated with an organic solution 2 which was a kerosine solution having 20 vol% tri-butyl phosphate (TBP) under the condition of O/A=1/4 in operation 5. The loaded organic solution 2 obtained in operation 5 was treated with a strip solution 2 of 0.1 mol/l hydrochloric acid in aqueous solution under the condition of O/A=3/1 in operation 6, and gallium was stripped from the loaded organic solution 2.

The metal concentrations in the aqueous solutions at several steps in the above-mentioned process are shown in the following table:

|  | (g/l) | | | | | |
| --- | --- | --- | --- | --- | --- | --- |
|  | Ga | Fe | Al | V | Ni | Na |
| Sulfuric acid leach liquor | 0.2 | 2 | 10 | 0.2 | 0.7 | 6 |
| after operation 3 | 2 | 0.01 | 1 | 0.1 | 0 | 0 |
| after operation 6 | 22 | 0.1 | 0 | 0 | 0 | 0 |

In this process, the recovery of gallium was more than 96%.

As mentioned above, the present invention provides a process for the continuous and smooth recovery of gallium from the mineral acid leach liquor of an aluminum smelting dust. Every reaction is performed simply by mixing and separating the organic and aqueous solutions. Tedious processes such as precipitation or filtering are not contained in present process.

Additionally, all the chemical reactions are performed at room temperature, energy is saved, and the amount of material to be processed, as well as operation conditions are easily controlled by merely adjusting the flow rates of the solutions without stopping the process.

The obtained gallium has a high degree of purity, and is recovered in high yields.

What we claim are:

1. A process for recovering gallium from aluminum smelting dust comprising
   (a) leaching aluminum smelting dust with sulfuric acid to obtain a leach liquor;
   (b) extracting the leach liquor with a first organic solution containing an extracting agent comprising a liquid cation exchange agent selected from the group consisting of organic phosphoric acid, organic phosphoric acid and organic phosphoric acid having 8 to 20 carbon atoms per molecule to extract gallium and impurities from the leach liquor and to produce a first loaded organic solution;

(c) scrubbing the first loaded organic solution with an aqueous solution of 4–9 mol/l hydrochloric acid to scrub off the impurities;

(d) stripping the scrubbed loaded organic solution with a mineral acid selected from the group consisting of hydrochloric acid, sulfuric acid and nitric acid having a concentration higher than 0.1 mol/l to quantitatively strip gallium and to produce a stripped liquor;

(e) adjusting the acid concentration of the stripped liquor with hydrochloric acid to more than about 3 mol/l in concentration;

(f) extracting the concentration-adjusted stripped liquor with a second organic solution containing a neutral extracting agent selected from the group consisting of isopropyl ether, tributyl phosphate, methyl isobutyl ketone and trioctyl phosphine oxide to extract gallium and iron from the stripped liquor and to produce a second loaded organic solution; and (g) stripping the second loaded organic solution with water or a dilute solution of mineral acid selected from the group consisting of hydrochloric acid, sulfuric acid and hydrochloric acid to strip gallium from the solution.

2. A process according to claim 1, wherein step (c) is performed subsequent to step (d).

3. A process according to claim 1, wherein the impurities comprise iron, vanadium and aluminum and the first loaded organic solution is scrubbed with an aqueous solution containing from about 5 to about 9 mol/l of hydrochloric acid.

4. A process according to claim 1, wherein the scrubbed loaded organic solution is stripped with an aqueous solution containing from about 1 to about 5 mol/l of hydrochloric acid.

5. A process according to claim 1, wherein substantially all gallium and some iron are extracted in step (f).

6. A process according to claim 1, wherein the stripped first organic solution is recirculated for use in extracting step (b) and the stripped second organic solution is recirculated for use in extracting step (f).

7. A process according to claim 1, wherein the first and second organic solutions contain a diluent miscible with the extracting agents and insoluble in water.

8. A process according to claim 1, wherein the liquid cation exchange agent is selected from the group consisting of 2-ethylhexyl phosphoric acid, mono-2-ethylhexyl phosphoric acid and di-2-ethylhexyl phosphoric acid.

9. A process according to claim 1, wherein gallium is present in the aluminum smelting dust in an amount ranging from about 0.08 to about 0.3 percent by weight.

* * * * *